Brainerd & Burridge,
Leaching Apparatus.
No. 2,523. Reissued Mar. 19, 1867.
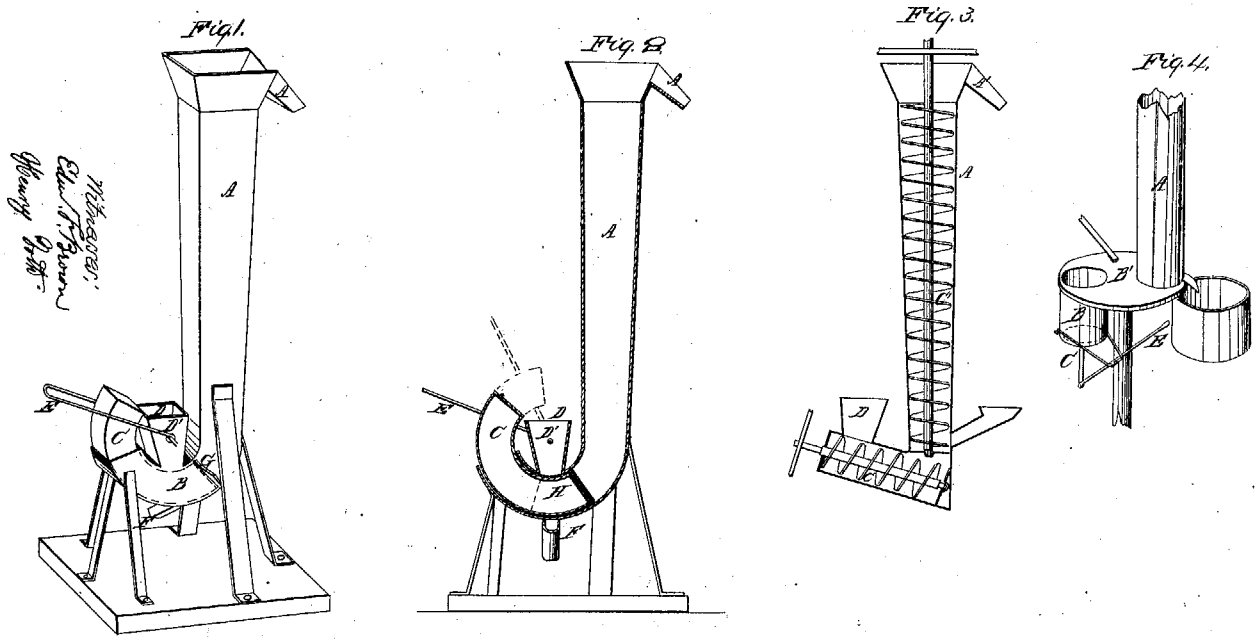
N. PETERS, PHOTO-LITHOGRAPHER, WASHINGTON, D. C.

UNITED STATES PATENT OFFICE.

W. H. BURRIDGE AND J. BRAINARD, OF CLEVELAND, OHIO; SAID BRAINARD ASSIGNOR TO SAID BURRIDGE.

IMPROVED PROCESS OF OBTAINING THE EXTRACTIVE MATTER OF TAN-BARK AND OTHER MATERIAL BY DISPLACEMENT.

Specification forming part of Letters Patent No. 34,873, dated April 8, 1862; Reissue No. 2,523, dated March 19, 1867.

*To all whom it may concern:*

Be it known that JEHU BRAINARD and WILLIAM H. BURRIDGE, of Cleveland, in the county of Cuyahoga and State of Ohio, have invented certain new and useful Improvements in the Process of Obtaining the Extractive Properties of Tan-Bark and other Substances by Displacement, and for Filtering and other Similar or Analogous Purposes; and whereas the said BRAINARD, for a valuable consideration, has assigned and transferred his entire interest and title in and to said invention to the said BURRIDGE on the 8th day of April, 1862, I do therefore hereby declare that the following is a full and complete description of the same, reference being had to the accompanying drawings, which are presented in illustration of the process, and making a part of this specification.

The nature of this invention relates to a new and useful process of obtaining extracts, so as to secure the entire strength of the material acted upon, by introducing the material to be treated into the lower end of a column, in horizontal layers or divisions, and discharging the spent material at the top of said column, thus exposing all the material to the action of clear water or other liquid, by introducing the same into the top of the column and allowing it to pass out at the bottom; and for filtering purposes, the material used as a filter—as charcoal, bone-black, or other meterial—is introduced at the bottom of the column and discharged at the top at pleasure after being deprived of its filtering property, the liquid to be filtered being introduced at the top. In this way, either in obtaining extracts, decoctions, or filtrates, the liquid is introduced at the top of the column, and the material acted upon or the substance that forms the filter being introduced at the bottom. In both cases the solid matter is introduced at the bottom of the column and discharged at the top, and the liquid is introduced at the top and discharged at the bottom.

As adapted to obtaining the strength of tan-bark two very important results are obtained: First, all of the bark is subjected to the action of fresh water, and consequently parts with all its soluble properties; second, by having a column of suitable height a saturated solution is always obtained. In the adaptation of this process to filtering, the filter can be renewed at the bottom, and thus the material utilized to its fullest extent.

It is obvious that several methods can be made available in carrying this process into operation.

In the accompanying drawings I have shown three distinct forms of apparatus, and a number of others could be made equally available, some of which will be hereinafter described.

It is desired to be distinctly understood that this invention is not confined to the use of any particular device or apparatus, but to employ or use any known plan or system by which the spirit of the same may be carried out.

A, Figures 1 and 2, represents a hollow cylinder, which may be either round or square, from two to three feet in diameter, and in height about twenty feet, more or less. The cylinder has a true taper from the bottom to the top, being a little larger at the top. The lower end, B, has a semicircular termination in which a semicircular piston or plunger, C, is caused to operate. This semicircular piston or plunger has its fulcrum at D′, on the two sides of the hopper D. This hopper D is placed at the lowest part of the semicircle B, and through which the bark or other material is introduced into the bottom of the cylinder. The fulcrum D′ of the plunger being the center point of the segment of the circle B, its movement in the circle B is natural and easy.

E is a lever by which the plunger C is operated.

F is a spout to conduct off the decoction or filtrate into suitable vessels.

G is a sliding gate, which is shoved in between the plunger and the material with which the cylinder A is being charged, to prevent it from falling back after it has been lifted into the cylinder A, when the plunger is withdrawn.

When the plunger is raised, as indicated by the dotted lines in Fig. 2, and the gate G shoved in the space H beneath, the hopper D will be clear, and if the hopper is now filled with bark or other material, the space H will also become filled. Now, by withdrawing the gate G and carrying the plunger downward the bark or other material will be forced into the upright hollow cylinder A. The gate G being now shoved in between the forward end of the plunger and the bark or other material, the plunger can be withdrawn and another charge introduced, and so on until the cylinder A is full.

In using this process in obtaining extracts, &c., it will be readily seen that by introducing heated water at the top of the cylinder A over the surface of the bark until all the bark in the cylinder becomes saturated, a concentrated liquor will flow from the spout F, and by the continuous introduction of bark at the bottom of the cylinder, and the continuous flow of water through the bark, as above described, all the tannin or other extractive matter will become displaced, and the water become charged to saturation. Now, every charge of bark or other material that is introduced at H will displace an equal quantity of spent bark, &c., at the top of the cylinder A, and should it require fifty charges to fill the cylinder, then every charge will undergo an equivalent of that number of leachings, thus obtaining all the strength of the bark, besides obtaining a liquor of uniform strength.

Instead of the plunger shown in Figs. 1 and 2, I contemplate using any other convenient device which will accomplish the same object, namely: The Archimedean screw (shown in Fig. 3) may be used for the purpose of carrying the bark or other material into the upright cylinder, or a charger, B, Fig. 4, may be placed below and connected with a revolving disk, B′, the charger being filled with bark or other material, either loosely or in vessels with perforated bottoms, which fit into the top of the vessel immediately below it when brought into place, and rotated beneath the cylinder or other frame-work or guides and raised one after another by means of the plunger C and lever E, as in Fig. 4.

The superior advantages of this process of extracting the strength of tan-bark and other substances by displacement will become apparent when it is stated that the usual practice now is to put the dry bark into a large tank, saturate it with water or spent tan-liquor, and bring the whole to a boiling heat by means of a steam-pipe. The decoction thus obtained is drawn off and a second "leaching," as it is termed, takes place usually; but it must be observed that if a ton of bark requires a ton of water to saturate it, this amount of water must remain behind in drawing off the decoction, and is as fully charged with tannin as that which is drawn off for use, thus losing at least one-third of all the strength of the bark. By this improved method or process all this is saved without an increase in the volume of water used.

The whole interior of the cylinder A may be heated, together with the contents thereof, by introducing a steam-pipe at or near the base, which will greatly facilitate the extracting process.

What I claim as my invention, and desire to secure by Letters Patent, is—

1. The process herein described for making extracts and for filtering purposes, which consists in dividing the material from which the extract is made, or which forms the filter, into a series of horizontal layers or divisions, either with or without a perforated diaphragm, and by which, by suitable mechanical means, fresh material may be introduced into the bottom of the column and the exhausted material discharged at the top.

2. The introduction of water or liquid to be filtered at the top of the column, while the fresh material or filter is introduced at the bottom and discharged at the top, substantially as specified.

3. Obtaining the extractive property of bark by the process herein described.

W. H. BURRIDGE.

Witnesses:

J. H. BURRIDGE,

E. E. WAITE.